United States Patent
Sakuda et al.

(10) Patent No.: US 10,198,121 B2
(45) Date of Patent: Feb. 5, 2019

(54) PROJECTED CAPACITIVE TOUCH SWITCH PANEL

(71) Applicants: NORITAKE CO., LIMITED, Aichi (JP); NORITAKE ITRON CORPORATION, Mie (JP)

(72) Inventors: Hitoshi Sakuda, Mie (JP); Isamu Kanda, Mie (JP); Tadami Maeda, Mie (JP)

(73) Assignees: NORITAKE CO., LIMITED, Aichi (JP); NORITAKE ITRON CORPORATION, Mie (JP)

( * ) Notice: Subject to any disclaimer, the term of this patent is extended or adjusted under 35 U.S.C. 154(b) by 0 days.

(21) Appl. No.: 15/125,926

(22) PCT Filed: Mar. 13, 2015

(86) PCT No.: PCT/JP2015/057415
§ 371 (c)(1),
(2) Date: Sep. 13, 2016

(87) PCT Pub. No.: WO2015/137477
PCT Pub. Date: Sep. 17, 2015

(65) Prior Publication Data
US 2017/0003823 A1 Jan. 5, 2017

(30) Foreign Application Priority Data
Mar. 13, 2014 (JP) ................. 2014-050403

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 2203/04103* (2013.01); *G06F 2203/04111* (2013.01)

(58) Field of Classification Search
CPC ...................................................... G06F 3/044
See application file for complete search history.

(56) References Cited

U.S. PATENT DOCUMENTS

2009/0322702 A1* 12/2009 Chien ................... G06F 3/0412
345/174
2012/0127387 A1* 5/2012 Yamato .................. G06F 3/044
349/42

(Continued)

FOREIGN PATENT DOCUMENTS

CN 102870073 A 1/2013
JP 2006-338668 A 12/2006

(Continued)

OTHER PUBLICATIONS

International Search Report for PCT/JP2015/057415 dated Apr. 14, 2015.
Supplementary European Search Report dated Sep. 20, 2017.

*Primary Examiner* — Vijay Shankar
*Assistant Examiner* — Cory A Almeida
(74) *Attorney, Agent, or Firm* — Hedman & Costigan, P.C.; James V. Costigan; Kathleen A. Costigan (57) ABSTRACT

To provide a projected capacitive touch switch panel having sensor units that are easy to adjust and that minimally reflect visible light, and furthermore having adequate environment-resistance properties. A projected capacitive touch switch panel 1 comprising a glass substrate 2 that has a sensor unit 3 for performing detection along the X direction, and a glass substrate 4 that has a sensor unit 5 for performing detection along the Y direction, in which: the two glass substrates are laminated, and the sensor units are sandwiched between the glass substrates so as to face each other; each of the sensor units has a sensor electrode comprising an Al thin film, and a blackened film including at least one metal selected from Cr, Mo, and W.

5 Claims, 5 Drawing Sheets

(56) References Cited

U.S. PATENT DOCUMENTS

| | | | |
|---|---|---|---|
| 2013/0004779 A1 | 1/2013 | Ogata | |
| 2014/0016047 A1 | 1/2014 | Hwang | |
| 2015/0177876 A1* | 6/2015 | Ishii | G06F 3/044 345/174 |

FOREIGN PATENT DOCUMENTS

| | | |
|---|---|---|
| JP | 2007-034644 A | 2/2007 |
| JP | 3161738 U | 8/2010 |
| JP | 2012-079238 A | 4/2012 |
| JP | 2013-525913 A | 6/2013 |
| JP | 2014-016944 A | 1/2014 |
| KR | 10-2011-0120157 A | 11/2011 |
| KR | 10-2012-0035874 A | 4/2012 |
| TW | 201211853 A1 | 3/2012 |
| TW | 201224903 A1 | 6/2012 |
| TW | 201423511 A | 6/2014 |
| WO | 2007/013499 A1 | 2/2007 |
| WO | 2011/136542 A2 | 11/2011 |
| WO | 2014/010620 A1 | 1/2014 |

\* cited by examiner

PROJECTED CAPACITIVE TOUCH SWITCH PANEL

TECHNICAL FIELD

The present invention relates to a projected capacitive touch switch panel for detecting that a finger of a user, etc., has approached a given position on a touch surface (XY plane) through a change in capacitance. In particular, the present invention relates to a projected capacitive touch switch panel in which a sensor electrode is provided on a glass substrate.

BACKGROUND ART

In household electrical appliances, AV devices, PC/OA devices, industrial machinery, and other electrical devices, touch switch panels involving projected capacitance schemes are used as one type of input means. In a projected capacitance scheme, a plurality of sensor electrodes are arrayed in a grid configuration along an X direction and a Y direction. Projected capacitive touch switch panels are typically configured from X-direction and Y-direction transparent sensor electrode layers formed of indium tin oxide ("ITO"), a wiring layer leading to the electrodes, an insulation layer (dielectric layer) provided between transparent electrodes, a surface-protective layer, and the like, the projected capacitive touch switch panels having external control units. When the panel surface is touched by a finger, capacitive coupling occurs between the sensor electrodes and the finger, changing the capacitance of the sensor electrodes. The control unit quantifies the amount of change in the capacitance of the sensor electrodes, and assesses that a finger has touched [the panel surface] when the quantity exceeds a predetermined threshold value. This makes it possible for the control unit to detect which position (XY coordinates on a plane) has been touched by the finger.

One structure known as a specific structure of a projected capacitive touch switch panel is configured such that X-direction transparent sensor electrodes are formed on one glass substrate, a Y-direction transparent sensor electrode layer is formed on another glass substrate, and the glass substrates are superposed so that one of the glass substrates is positioned between the transparent sensor electrodes, constituting an insulation layer (dielectric layer). In another proposed structure, transparent sensor electrodes are formed of ITO on each of two glass substrates, the transparent sensor electrodes are arranged so as to face each other, the glass substrates are superposed with a spacer member interposed therebetween, and a dielectric material is injected between the transparent sensor electrodes (see Patent Document 1). Similarly, a structure was proposed in which transparent sensor electrodes are formed of ITO on each of two glass substrates, the transparent sensor electrodes are arranged so as to face each other, and an insulating adhesive layer is formed between the transparent sensor electrodes (see Patent Document 2).

PRIOR ARTS LIST

Patent Documents

Patent Document 1: Japanese Laid-Open Patent Application No. 2006-338668
Patent Document 2: Registered Utility Model No. 3161738

SUMMARY OF THE INVENTION

Problem to be Solved by the Invention

In cases in which two glass substrates are used, one of which being utilized as an insulation layer (dielectric layer) between sensor electrodes, a gap will form between the electrodes depending on the thickness of the insulation layer, complicating adjustment of the sensors by the control unit. Additionally, the transparent sensor electrodes need to have high transmittance in order to maintain high display quality, and also need to have low resistance in order to enable the control unit to detect signal changes on the order of milliseconds. In cases in which transparent sensor electrodes formed of ITO are used, as described in Patent Document 1 and Patent Document 2, it is possible to obtain low resistance by forming the electrodes on the glass substrates and increasing the film thickness of the ITO film; however, a problem is presented in terms of the external appearance because a yellowish tinge results from the ITO film being increased in thickness. Therefore, it is not easy to achieve the required low resistance without adversely impacting the transmittance, etc.

There exist methods by which an aluminum thin film is used instead of ITO, and the sensor electrodes are formed in a fine lattice configuration so as to be substantially transparent to the naked eye. However, aluminum thin films have very high reflectance in the visible spectrum (at wavelengths of approximately 400-700 nm), and readily produce glare, adversely affecting the visual properties (transmittance properties) of the touch screen.

In the case of a structure in which the transparent sensor electrodes are not sandwiched between substrates, it is necessary to provide a protective layer to one sensor-electrode side; however, this structure may be incompatible with applications in severe environments.

The present invention was devised in order to address the aforementioned problems, and therefore an object of the present invention is to provide a projected capacitive touch switch panel having sensor units that are easy to adjust and that minimally reflect visible light, and furthermore having adequate environment-resistance properties.

Means for Solving the Problem

The projected capacitive touch switch panel of the present invention detects a touch position on a touch screen spread out along an X direction and a Y direction, characterized in that: the projected capacitive touch switch panel comprises a glass substrate having a sensor unit for performing detection along the X direction, and a glass substrate having a sensor unit for performing detection along the Y direction, the two glass substrates being laminated, and each of the sensor units being sandwiched facing each other between the glass substrates; each of the sensor units has a sensor electrode formed using sputtering or vacuum deposition, the sensor electrode comprising an aluminum (hereinafter referred to as "Al") thin film, and a blackened film laminated on at least part of the Al thin film, the blackened film containing at least one metal selected from chromium (hereinafter referred to as "Cr"), molybdenum (hereinafter referred to as "Mo"), and tungsten (hereinafter referred to as "W"); one surface of one of the glass substrates constitutes a touch surface, and in the sensor unit of the aforementioned glass substrate, the blackened film is formed on the aforementioned glass substrate on the opposite surface from the touch surface, and the Al thin film is formed on the blackened film; and in the sensor unit of the other glass substrate, the Al thin film is formed on the surface of the glass substrate, and the blackened film is formed on the Al thin film.

The projected capacitive touch switch panel of the present invention is further characterized in that at least part of the sensor unit has a translucent part, the translucent part is configured as a lattice in which the Al thin film and the blackened film are overlapped, and the interstices constitute openings.

The projected capacitive touch switch panel of the present invention is further characterized in that the blackened film includes at least one oxide selected from Al oxides and titanium (hereinafter referred to as "Ti") oxides. In particular, the projected capacitive touch switch panel of the present invention is further characterized in that the blackened film comprises a mixture of the Mo and the Al oxide. Additionally, the projected capacitive touch switch panel of the present invention is further characterized in that the oxide content in the blackened film is 2-16 wt. % with respect to the total amount of the metal and the oxide.

The projected capacitive touch switch panel of the present invention is further characterized in that the film thickness of the blackened film is 5-500 nm, and the layer thickness of the Al thin film is 500-5000 nm.

Effects of the Invention

Because the projected capacitive touch switch panel of the present invention detects a touch position on a touch screen spread out along an X direction and a Y direction, and is configured such that: the projected capacitive touch switch panel comprises a glass substrate having a sensor unit for performing detection along the X direction, and a glass substrate having a sensor unit for performing detection along the Y direction, the two glass substrates being laminated, and the sensor units being sandwiched between the glass substrates so as to face each other; each of the sensor units has a sensor electrode formed using sputtering or vacuum deposition, the sensor electrode comprising an Al thin film, and a blackened film laminated on at least part of the Al thin film, the blackened film including at least one metal selected from Cr, Mo, and W; one surface of one of the glass substrates constitutes a touch surface, and in the sensor unit of the aforementioned glass substrate, the blackened film is formed on the surface opposite the touch surface of the glass substrate, and the Al thin film is formed on the blackened film; and in the sensor unit of the other glass substrate, the Al thin film is formed on the surface of the glass substrate, and the blackened film is formed on the Al thin film, no gap is formed between the two sensor electrodes, facilitating adjustment of the sensors by a control unit. Additionally, because each of the sensor units has the Al thin film and the blackened film formed thereon in the stated order, the projected capacitive touch switch panel appears black when viewed from the touch surface, making it possible to minimize the reflection of visible light. Furthermore, due to the structure in which the sensor units are sandwiched between the glass substrates, the metal thin films are protected, making it possible to enhance the environment-resistance properties.

Because the projected capacitive touch switch panel of the present invention is further configured such that at least part of the sensor unit has a translucent part, the translucent part is configured as a lattice in which the Al thin film and the blackened film are overlapped, and the interstices constitute openings, it is possible to form transparent sensor units that minimally reflect visible light.

Because the projected capacitive touch switch panel of the present invention is further configured such that the blackened film includes at least one oxide selected from Al oxides and Ti oxides, it is possible to further reduce the reflectance with respect to visible light.

MODE FOR CARRYING OUT THE INVENTION

Figure 1:
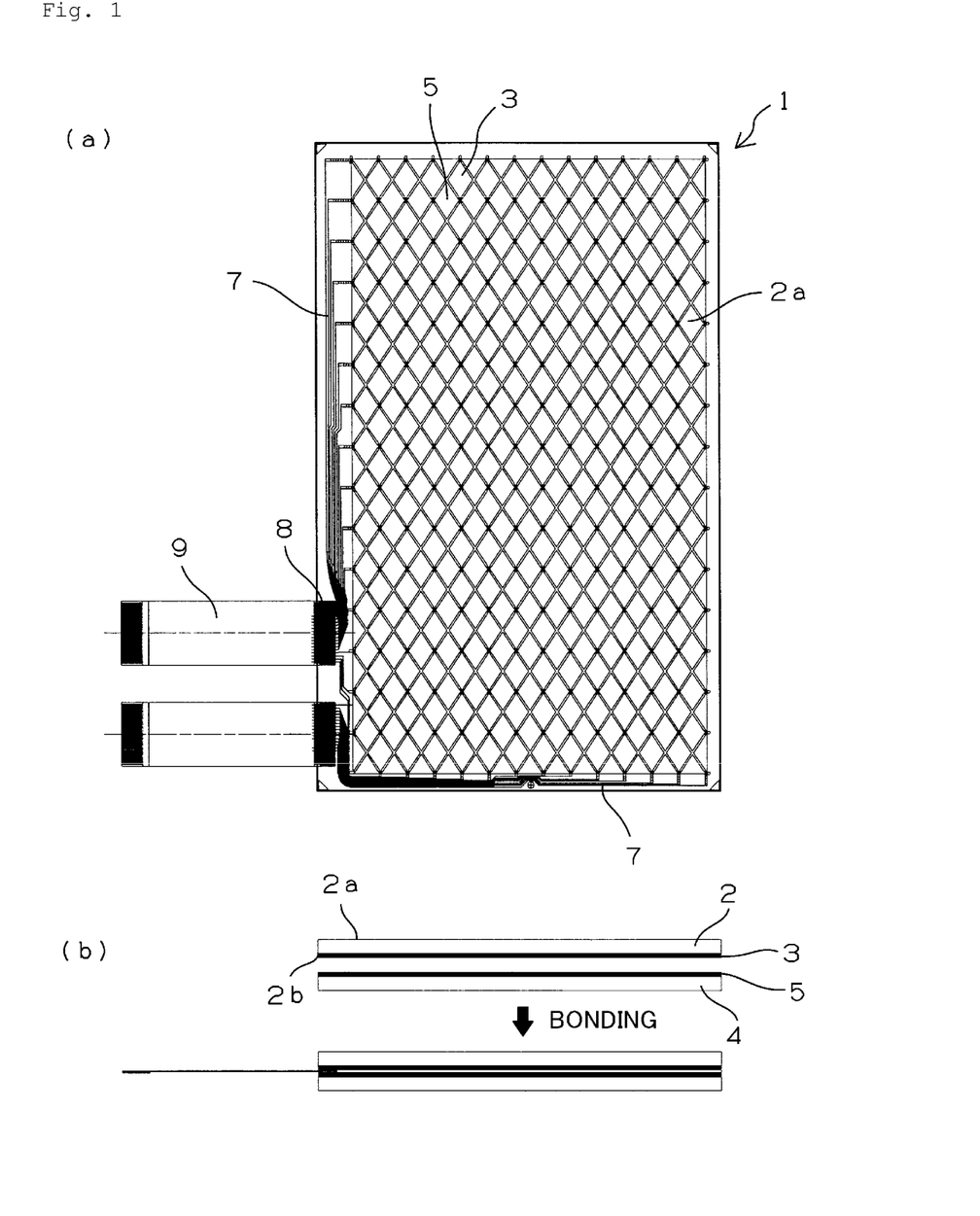
FIG. 1 is a front view and a side view of one example of the projected capacitive touch switch panel of the present invention.
Figure 2:
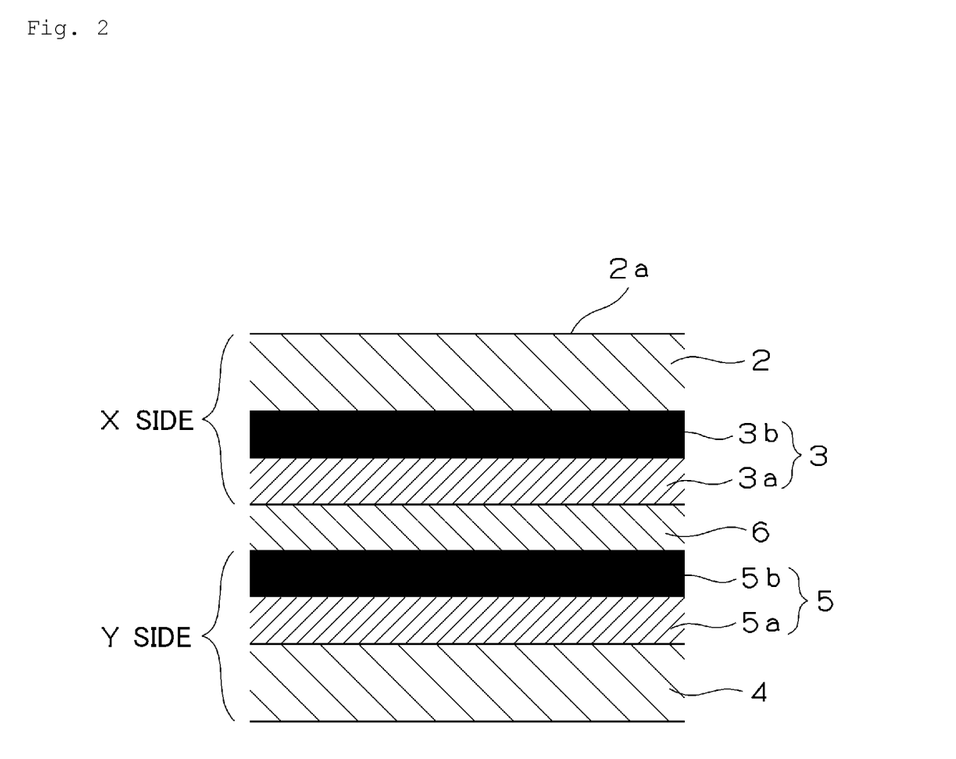
FIG. 2 is a schematic view of an enlarged cross-section of the panel in FIG. 1.
Figure 3:
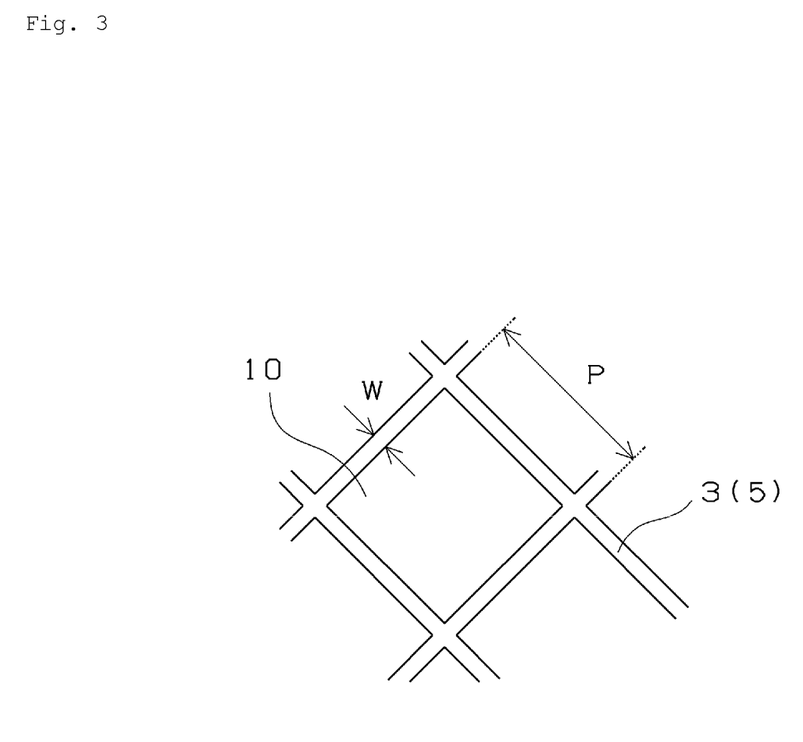
FIG. 3 is a partial enlarged view of a sensor unit in FIG. 1.

One example of the projected capacitive touch switch panel of the present invention is described on the basis of FIGS. 1-3. FIG. 1(a) is a front view of the projected capacitive touch switch panel, and FIG. 1(b) is a side view of the same. As shown in FIG. 1(b), a projected capacitive touch switch panel 1 comprises a translucent first glass substrate 2 having a sensor unit 3 for performing detection along an X direction, and a translucent second glass substrate 4 having a sensor unit 5 for performing detection along a Y direction, the projected capacitive touch switch panel 1 having a laminated structure in which the first glass substrate 2 and the second glass substrate 4 are bonded together. One surface of the first glass substrate 2 constitutes a touch surface 2a, the sensor unit 3 being provided on the opposite surface 2b from the touch surface 2a. The sensor unit 5 is provided on one surface of the second glass substrate 4. The sensor unit 3 and the sensor unit 5 are sandwiched facing each other between the two glass substrates. As shown in FIG. 1(a), the sensor unit 3 for performing detection along the X direction and the sensor unit 5 for performing detection along the Y direction are patterned in a rhomboid shape aligned vertically (Y direction) and horizontally (X direction). Because the structure has no glass substrate interposed between the two sensor electrodes, the gap between the sensor electrodes is dramatically smaller than in a case in which a glass substrate is interposed therebetween.

A flexible printed circuit board (FPC) 9 is connected to an external connection terminal 8, which is connected to the sensor electrodes of each of the sensor units by wiring 7. A control unit (not shown) for detecting touch is connected via the FPC 9. A metal lead frame may be provided in lieu of the FPC 9 in order to enhance environment-resistance properties. Changing of the capacitance of the sensor electrodes caused when capacitive coupling occurs between the electrodes and a finger is utilized in the projected capacitive touch switch panel of the present invention. A well-known procedure can be used for the specific detection procedure, etc., of the control unit.

FIG. 2 is a schematic view of an enlarged cross-section of the panel. As shown in FIG. 2, the sensor unit 3 for performing detection along the X direction has a blackened film 3b formed on the opposite surface from the touch surface 2a of the first glass substrate 2, and a sensor electrode 3a comprising an Al thin film formed on the blackened film 3b. Additionally, the sensor unit 5 for performing detection along the Y direction has a sensor electrode 5a comprising an Al thin film formed on one (first-glass-substrate-side) surface of the second glass substrate 4, and a blackened film 5b formed on the Al thin film. When viewed from the touch surface 2a, both of the sensor units are formed such that the Al thin film is positioned below the blackened film. The blackened film absorbs incident light due to interference with visible light, and thus appears black. The blackened film is a thin film including a prescribed metal, as described later. The Al thin film and the blackened film are laminated in order to minimize the reflection of visible light by the Al thin film; no blackened film is formed on portions in which the metallic luster (silver color) of the Al thin film is intentionally exposed in the interest of, e.g., providing a switch design.

Additionally, an insulation layer 6 is formed, as necessary, between the X-side sensor electrode 3a and the Y-side blackened film 5b. After the insulation layer 6 is formed on one of the surfaces of the sensor electrode 3a and blackened film 5b, or on both of these surfaces, the two glass substrates are laminated. Examples of the insulation layer 6 include coating films formed by applying an organic resin paste using a dispenser. A thickness of 50-500 μm is suitable for the insulation layer. When the thickness of the insulation layer exceeds 500 μm, the gap between the sensor electrodes increases, and a difference is created between the sensitivity of the X-side sensor and that of the Y-side sensor.

FIG. 2 is a schematic view for illustrating the overall hierarchical relationship between the sensor units positioned between the two glass substrates. The sensor unit (sensor electrode) for performing detection along the X direction and the sensor unit (sensor electrode) for performing detection along the Y direction are arranged at positions that do not overlap when viewed in the XY plane. Additionally, in FIGS. 1 and 2, the sensor unit for performing detection along the X direction is provided to the touch-surface-side first glass substrate; however, a configuration may be adopted in which the sensor unit for performing detection along the Y direction is provided to the first glass substrate, and the sensor unit for performing detection along the X direction is provided to the second glass substrate.

FIG. 3 is a partial enlarged view of a sensor unit. As shown in FIG. 3, the rhomboid shape of the sensor units as shown in FIG. 1(a) is formed from finer lattice portions. The Al thin films (sensor electrodes) and the blackened films are overlapped in the order described above in the lattice portions of the sensor unit 3 and sensor unit 5. The interstices constitute openings 10; the Al thin film and blackened film are not formed in these portions. Because a very fine lattice configuration is formed in the lattice portions, these portions constitute translucent parts that at first appear to be transparent when viewed. The lattice portions typically have a line width W of 3-50 μm and a line pitch P of 0.2-1 mm. It is also possible for the shape to be hexagonal, rectangular or rhomboid (extending vertically), trapezoidal, or any desired shape, as long as continuous lines are used in its formation. Because the Al thin film has very high reflectance with respect to visible light and readily produces glare, the Al thin film adversely affects the visual properties of the touch surface when exposed, even when formed in a fine lattice configuration. However, in the present invention, a prescribed blackened film is interposed on the Al thin film when viewed from the touch surface, whereby reflectance with respect to visible light is reduced and visibility is ensured.

The first glass substrate 2 and the second glass substrate 4 are translucent insulation substrates; soda-lime glass, quartz glass, borosilicate glass, alkali-free glass that contains no alkali components, or the like can be employed as the material therefor. Soda-lime glass is preferably used due to its high transmittance and very low cost, such glass being used in window glass for generic building materials. Each of the glass substrates is 0.5-5 mm thick, and preferably 1.8-3.0 mm thick.

The sensor electrodes of each of the sensor units comprise an Al thin film. The Al thin film is formed by a vacuum process; i.e., sputtering or vacuum deposition using an Al solid target (deposition material). The wiring 7 (see FIG. 1(a)) is simultaneously integrally formed with the sensor electrodes. Sputtering is more preferably performed as the vacuum process because uniform films can be formed. Sputtering is a method for causing accelerated argon ions to collide with a solid target, and causing the atoms or molecules that are scattered from the target surface to adhere to the glass substrate to thereby form a film.

There is no particular limitation as to the method for processing the Al thin film into a lattice or other prescribed shape; however, well-known photo-resolution techniques are preferably used because it will then be possible to accurately form the abovementioned fine lattice portions and the wiring connected to the sensor electrodes. For example, a configuration may be adopted in which, after the Al thin film is formed by sputtering or vacuum deposition, a mask layer of an etching pattern is screen printed using a resist material, and wet-etching is performed using a prescribed etchant, whereby fine wiring is formed by wet etching. A thickness of 500-5000 nm is suitable for the Al thin film.

The blackened film of each of the sensor units comprises a thin film including (1) at least one metal selected from Cr, Mo, and W. The blackened film is formed by, e.g., vacuum deposition or sputtering. For the same reason given with respect to forming the abovementioned Al thin film, it is more desirable to employ the sputtering described above for forming the blackened film. Additionally, wet-etching or the like is performed when processing the lattice portions; from the standpoint of exceptional manufacturing efficiency, it is preferable to select, as the etchant, a liquid (e.g., a phosphoric acid etchant) with which it is possible to simultaneously etch the materials constituting the blackened film and the Al thin film. In this case, the lattice portions of each of the sensor units are formed by simultaneously etching both materials after the Al thin film and the blackened film are formed on the glass substrate.

Figure 5:
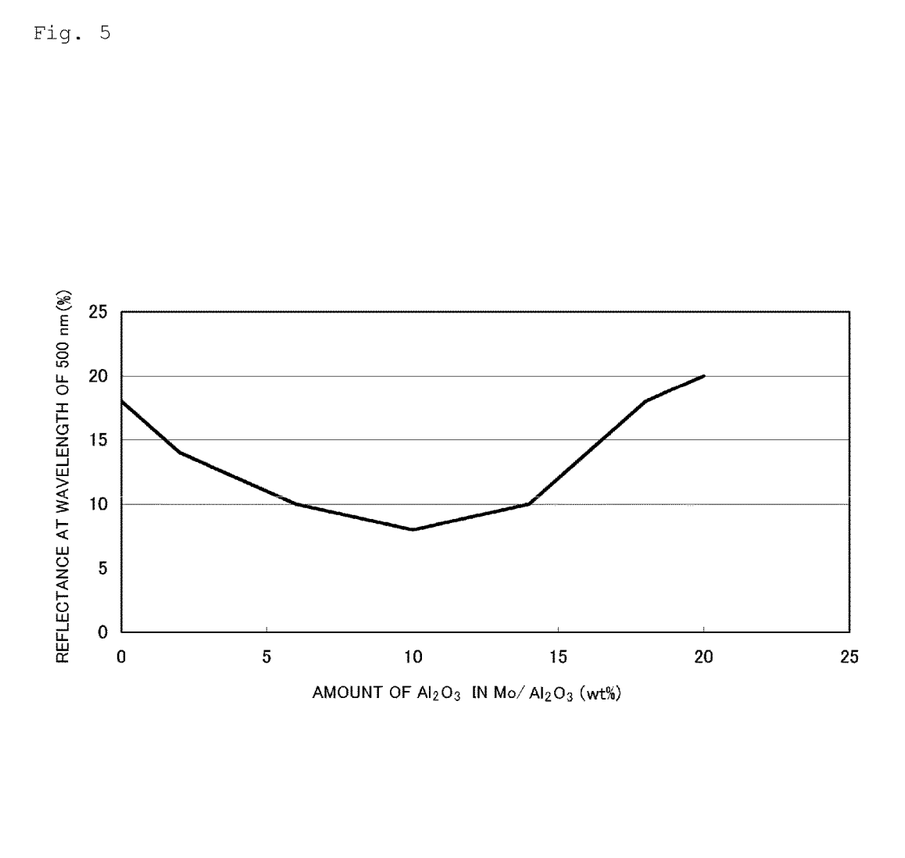
FIG. 5 is a graph showing the effects exerted on reflectance by the mixture composition ratio of the blackened film.

The blackened film preferably includes a prescribed amount of (2) at least one oxide selected from Al oxides and Ti oxides. Examples of Ti oxides include $TiO_2$, and examples of Al oxides include $Al_2O_3$. Including a prescribed amount of these oxides further reduces the reflectance, as shown in FIG. 5 (described later). When a blackened film comprising a mixture of (1) at least one metal selected from Cr, Mo, and W and (2) at least one oxide selected from Al oxides and Ti oxides is formed, the thin film is formed by vacuum deposition or sputtering using a solid target (deposition material) comprising this mixture.

Figure 4:
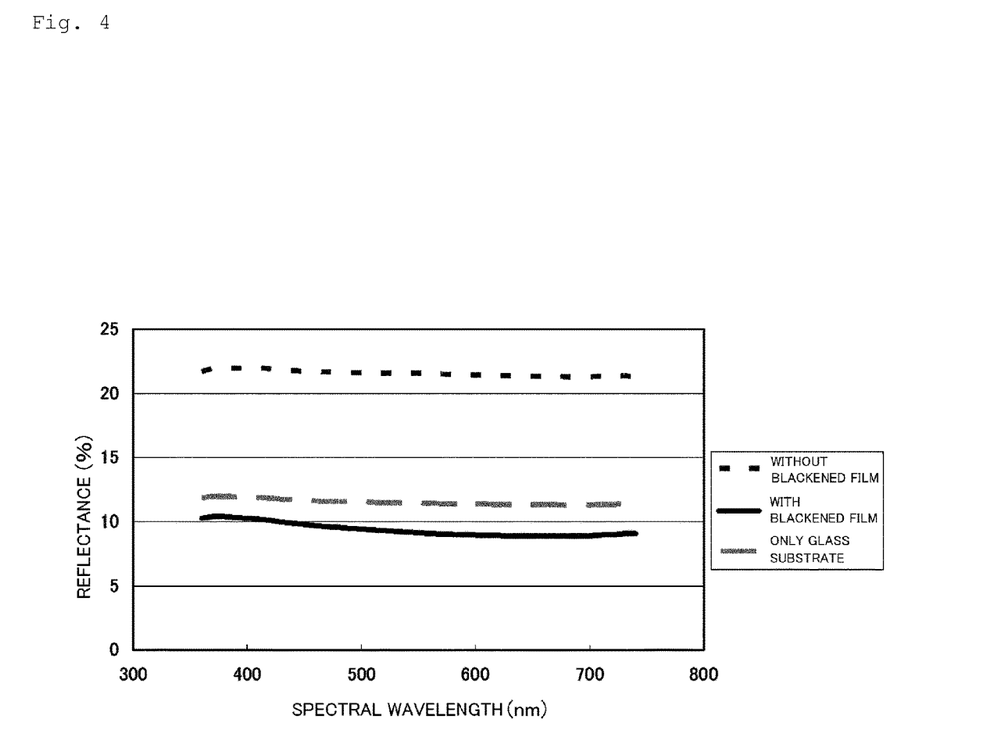
FIG. 4 is a graph showing the effects exerted on spectral characteristics of reflectance by the presence of a blackened film.

FIG. 4 shows one example of the effects exerted on spectral characteristics of reflectance by the presence of a blackened film. In FIG. 4, "with blackened film" indicates that a blackened film (100 nm) was formed by sputtering using a target comprising a mixture of Mo and $Al_2O_3$ (containing 10 wt. % of $Al_2O_3$), and a 99%-purity Al thin film (1000 nm) was formed on the blackened film by sputtering. Conversely, "without blackened film" indicates that only the Al thin film (1000 nm) from the above configuration was formed, and no blackened film was formed. As shown in FIG. 4, in the case in which no blackened film was provided, the reflectance was dramatically higher than that of the glass substrate. However, providing the blackened film resulted in the reflectance being less than that of the glass substrate alone. It is evident that the spectral characteristics are substantially flat across all wavelengths and no coloration occurred.

In cases in which the blackened film is configured as a mixture layer comprising (1) at least one metal selected from Cr, Mo, and W and (2) at least one oxide selected from Al oxides and Ti oxides, the mixture composition ratio affects the reflectance. Accordingly, in order to form a film having a desired composition ratio, it is preferable to use a solid target in the state of a mixture obtained by mixing the metal and the oxide approximately uniformly in the desired respective composition ratio in advance, during film formation. In the blackened film, because the type of metal in (1) the metal element and the type of metal constituting (2) the oxide are different, it is impossible to form the film having the composition described above by methods involving using a target comprising the metal element or using a mixed gas comprising argon and oxygen.

In the mixture composition ratio of the blackened film, an oxide content of 2-16 wt. % with respect to the total weight (metal element plus oxide) of the mixture is preferred. When the oxide content is less than 2 wt. %, the reduction in reflectance might be unachievable due to the appearance of metallic luster. Conversely, when the oxide content exceeds 16 wt. %, the reduction in reflectance might be unachievable due to the appearance of white turbidity.

FIG. 5 shows an example of the effects exerted by the mixture composition ratio of the blackened film. For FIG. 5, a blackened film (100 nm) was formed on a soda-lime glass substrate (0.7 mm) by sputtering using a target comprising a mixture of Mo and $Al_2O_3$, and a 99%-purity Al thin film (1000 nm) was formed on the blackened film by sputtering; measurements were made of changes in the reflectance with respect to visible light (at a wavelength of 500 nm) that occurred when the amount (wt. %) of $Al_2O_3$ in the mixture was changed. As shown in FIG. 5, when a mixture of Mo and $Al_2O_3$ is used in the blackened film, the $Al_2O_3$ content is preferably 2-16 wt. %, more preferably 5-15 wt. %, and particularly preferably 8-12 wt. %.

A film thickness of 5-500 nm is suitable for the blackened film. When the film thickness is less than 5 nm, blackening is insufficient, and the reduction in reflectance could be unachievable. Conversely, when the film thickness exceeds 500 nm, the effect for reducing reflectance due to the visible-light interference effect might be unobtainable. A film thickness of 50-200 nm is more desirable. The film thickness is determined for each of the blackened-film materials in accordance with the refractive index of the materials.

The projected capacitive touch switch panel 1 according to the embodiment shown in FIG. 1 is structured such that the first glass substrate 2 and the second glass substrate 4 are directly resin-sealed by the insulation layer 6, without a spacer glass or other spacer member being interposed therebetween. In the structure, the two glass substrates are superposed, and the sensor units are sandwiched between the glass substrates; therefore, the projected capacitive touch switch panel 1 has mechanical strength superior to that of a structure comprising a single glass substrate, and disconnection of the sensor electrodes or of the wiring can be prevented, even in cases when strong vibration or high pressure is applied.

As another embodiment of the projected capacitive touch switch panel of the present invention, a structure may be adopted in which a spacer member is provided around the glass substrates.

Embodiments of a projected capacitive touch switch panel were described above with reference to FIGS. 1-3; however, the configuration of the projected capacitive touch switch panel of the present invention is not limited to the aforedescribed embodiments.

INDUSTRIAL APPLICABILITY

The projected capacitive touch switch panel of the present invention has sensor units that are easy to adjust and that minimally reflect visible light; therefore, the present invention can be suitably utilized in household electrical appliances, AV devices, PC/OA devices, industrial machinery, and other electrical devices as input means for such apparatuses. Additionally, having exceptional environment-resistance properties, the projected capacitive touch switch panel of the present invention can be suitably utilized as input means for apparatuses used in severe environments, such as when installed outdoors or near heaters or a variety of other industrial machines.

EXPLANATION OF REFERENCE NUMERALS AND SYMBOLS

1 Projected capacitive touch switch panel
2 First glass substrate
3 Sensor unit for performing detection along X direction
4 Second glass substrate
5 Sensor unit for performing detection along Y direction
6 Insulation layer
7 Wiring
8 External connection terminal
9 Flexible printed circuit board (FPC)
10 Opening

The invention claimed is:
1. A projected capacitive touch switch panel for detecting a touch position on a touch screen spread out along an X direction and a Y direction, characterized in that:
the projected capacitive touch switch panel comprises a glass substrate having a sensor unit for performing detection along the X direction, and a glass substrate having a sensor unit for performing detection along the Y direction, the two glass substrates being laminated, and each of the sensor units being sandwiched facing each other between the glass substrates;
each of the sensor units has a sensor electrode formed using sputtering or vacuum deposition, the sensor electrode comprising an aluminum thin film, and a blackened film laminated on at least part of the aluminum thin film, the blackened film consisting of a mixture of molybdenum and aluminum oxide;
one surface of one of the glass substrates constitutes a touch surface, and in the sensor unit of the aforementioned glass substrate, the blackened film is formed on the aforementioned glass substrate on the opposite surface from the touch surface, and the aluminum thin film is formed on the blackened film; and in the sensor unit of the other glass substrate, the aluminum thin film is formed on the surface of the glass substrate, and the blackened film is formed on the aluminum thin film.

2. The projected capacitive touch switch panel according to claim 1, characterized in that at least part of the sensor unit has a translucent part, the translucent part is configured as a lattice in which the aluminum thin film and the blackened film are overlapped, and the interstices constitute openings.

3. The projected capacitive touch switch panel according to claim 1, characterized in that the aluminum oxide content of the blackened film is 2-16 wt. % with respect to the total amount of the molybdenum and the aluminum oxide.

4. The projected capacitive touch switch panel according to claim 1, characterized in that the film thickness of the blackened film is 5-500 nm, and the layer thickness of the aluminum thin film is 500-5000 nm.

5. A projected capacitive touch switch panel for detecting a touch position on a touch screen spread out along an X direction and a Y direction, characterized in that:

the projected capacitive touch switch panel comprises a glass substrate having a sensor unit for performing detection along the X direction, and a glass substrate having a sensor unit for performing detection along the Y direction, the two glass substrates being laminated, and each of the sensor units being sandwiched facing each other between the glass substrates;

each of the sensor units has a sensor electrode formed using sputtering or vacuum deposition, the sensor electrode comprising an aluminum thin film, and a blackened film laminated on at least part of the aluminum thin film, the blackened film comprising a mixture of molybdenum and aluminum oxide wherein the aluminum oxide content of the blackened film is 2-16 wt. % with respect to the total amount of the molybdenum and the aluminum oxide;

one surface of one of the glass substrates constitutes a touch surface, and in the sensor unit of the aforementioned glass substrate, the blackened film is formed on the aforementioned glass substrate on the opposite surface from the touch surface, and the aluminum thin film is formed on the blackened film; and in the sensor unit of the other glass substrate, the aluminum thin film is formed on the surface of the glass substrate, and the blackened film is formed on the aluminum thin film.

* * * * *